(12) United States Patent
Lee et al.

(10) Patent No.: US 12,063,650 B2
(45) Date of Patent: Aug. 13, 2024

(54) TRIGGER AND CANCELLATION OF SIDELINK SCHEDULING REQUEST BASED ON STATUS OF DIFFERENT DIRECT LINKS

(71) Applicant: LG Electronics Inc., Seoul (KR)

(72) Inventors: Youngdae Lee, Seoul (KR); Giwon Park, Seoul (KR); Jongyoul Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 17/604,702

(22) PCT Filed: May 4, 2020

(86) PCT No.: PCT/KR2020/005829
§ 371 (c)(1),
(2) Date: Oct. 18, 2021

(87) PCT Pub. No.: WO2020/222587
PCT Pub. Date: Nov. 5, 2020

(65) Prior Publication Data
US 2022/0201731 A1    Jun. 23, 2022

Related U.S. Application Data

(60) Provisional application No. 62/842,462, filed on May 2, 2019.

(51) Int. Cl.
*H04W 72/20* (2023.01)
*H04W 72/566* (2023.01)

(52) U.S. Cl.
CPC ......... *H04W 72/20* (2023.01); *H04W 72/569* (2023.01)

(58) Field of Classification Search
CPC ... H04W 72/20; H04W 72/569; H04W 72/21; H04W 76/14; H04W 76/11
See application file for complete search history.

(56) References Cited

U.S. PATENT DOCUMENTS

2016/0128094 A1*  5/2016  Lee .................. H04W 72/21
370/329
2016/0374110 A1  12/2016  Lee et al.
(Continued)

FOREIGN PATENT DOCUMENTS

CN    104737613    6/2015
CN    107079469    8/2017
(Continued)

OTHER PUBLICATIONS

Invention Patent Certificate in Chinese Appln. No. 202080033126.2, mailed on Jun. 27, 2023, 47 pages (with English cover).
(Continued)

*Primary Examiner* — Ricardo H Castaneyra
(74) *Attorney, Agent, or Firm* — Fish & Richardson P.C.

(57) ABSTRACT

A method and apparatus for trigger and/or cancellation of sidelink scheduling request (SR) in a wireless communication system is provided. A wireless device determines that a physical uplink control channel (PUCCH) resource for transmission of a scheduling request (SR) overlaps with a sidelink (SL) resource for transmission of a SL media access control (MAC) protocol data unit (PDU). The wireless device transmits, to a network, the SR by using the PUCCH resource when a priority of the SR is higher than a priority of the SL MAC PDU.

11 Claims, 13 Drawing Sheets

(56) References Cited

U.S. PATENT DOCUMENTS

| | | | |
|---|---|---|---|
| 2017/0245245 A1 | 8/2017 | Kim et al. | |
| 2017/0310531 A1 | 10/2017 | Dinan | |
| 2018/0054755 A1 | 2/2018 | Lee et al. | |
| 2018/0146500 A1* | 5/2018 | Muraoka | H04W 72/541 |
| 2018/0176937 A1* | 6/2018 | Chen | H04W 72/21 |
| 2018/0359766 A1 | 12/2018 | Shih | |
| 2020/0008266 A1* | 1/2020 | Pan | H04L 1/1642 |
| 2020/0236582 A1* | 7/2020 | Chin | H04W 72/23 |
| 2020/0260353 A1* | 8/2020 | Xu | H04W 4/40 |
| 2022/0210801 A1* | 6/2022 | Xu | H04W 72/21 |

FOREIGN PATENT DOCUMENTS

| | | |
|---|---|---|
| CN | 109478991 | 3/2019 |
| CN | 109565791 | 4/2019 |

OTHER PUBLICATIONS

Vivo, "Discussion on SR/BSR for NR Sidelink mode 1," 3GPP TSG-RAN WG2 Meeting #105bis, R2-1903631(Revision of R2-1901112), Xi'an, China, Apr. 8-12, 2019, 5 pages.

Huawei, HiSilicon, "Potential RAN2 impacts on gNB scheduled resource allocation for NR V2X," R2-1816518, Presented at 3GPP TSG-RAN WG2 # 104, Spokane, USA, Nov. 12-16, 2018, 5 pages.

Intel Corporation, "Handling of multiple SR configurations," R2-1708789 Revision of R2-1707024, Presented at 3GPP TSG RAN WG2 Meeting #99, Berlin, Germany, Aug. 21-25, 2017, 4 pages.

Intel Corporation, "UL/SL prioritization for NR V2X," R2-1903669 Revision of R2-1900883, Presented at 3GPP TSG-RAN WG2 Meeting 105bis, Xi'an, China, Apr. 8-12, 2019, 3 pages.

MediaTek Inc, "On sidelink SR," R2-1903876, Presented at 3GPP TSG-RAN WG2 Meeting #105bis, Xi'an, China, Apr. 8-Apr. 12, 2019, 5 pages.

\* cited by examiner

TRIGGER AND CANCELLATION OF SIDELINK SCHEDULING REQUEST BASED ON STATUS OF DIFFERENT DIRECT LINKS

CROSS-REFERENCE TO RELATED APPLICATIONS

This application is a National Stage application under 35 U.S.C. § 371 of International Application No. PCT/KR2020/005829, filed on May 4, 2020, which claims the benefit of U.S. Provisional Application No. 62/842,462, filed on May 2, 2019. The disclosures of the prior applications are incorporated by reference in their entirety.

TECHNICAL FIELD

The present disclosure relates to trigger and/or cancellation of sidelink scheduling request (SR) based on status of different direct links.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

Scheduling request (SR) is a special physical layer message for user equipment (UE) to ask network to send uplink (UL) grant so that UE can transmit physical uplink shared channel (PUSCH).

SUMMARY

An aspect of the present disclosure is to provide a method and apparatus for trigger and/or cancellation of sidelink SR based on status of different direct links.

An aspect of the present disclosure is to provide a method and apparatus for transmitting sidelink triggered SR based on priority comparisons with other transmissions.

In an aspect, a method for a wireless device in a wireless communication system is provided. The method includes determining that a physical uplink control channel (PUCCH) resource for transmission of a scheduling request (SR) overlaps with a sidelink (SL) resource for transmission of a SL media access control (MAC) protocol data unit (PDU), and transmitting, to a network, the SR by using the PUCCH resource based on that a priority of the SR is higher than a priority of the SL MAC PDU.

In another aspect, an apparatus for implementing the above method is provided.

The present disclosure can have various advantageous effects.

For example, a UE can perform SL triggered SR transmission based on direct priority comparisons with other transmissions.

For example, a UE can perform SL triggered SR transmission selectively based on priority of the SL triggered SR transmission, in particular when the UE cannot perform simultaneous transmission of the SL triggered SR SL transmission and other transmissions (e.g., SL MAC PDU and/or UL MAC PDU).

For example, a UE can avoid unnecessary SR transmission for sidelink resource allocation and properly handle overlapped transmission with SL/UL transmission, in particular when the UE has several direct links with several UEs and detects a problem on one of the direct links possibly due to overlapped transmission.

For example, the system can properly request SL resources when a UE performs several transmissions in SL and UL.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
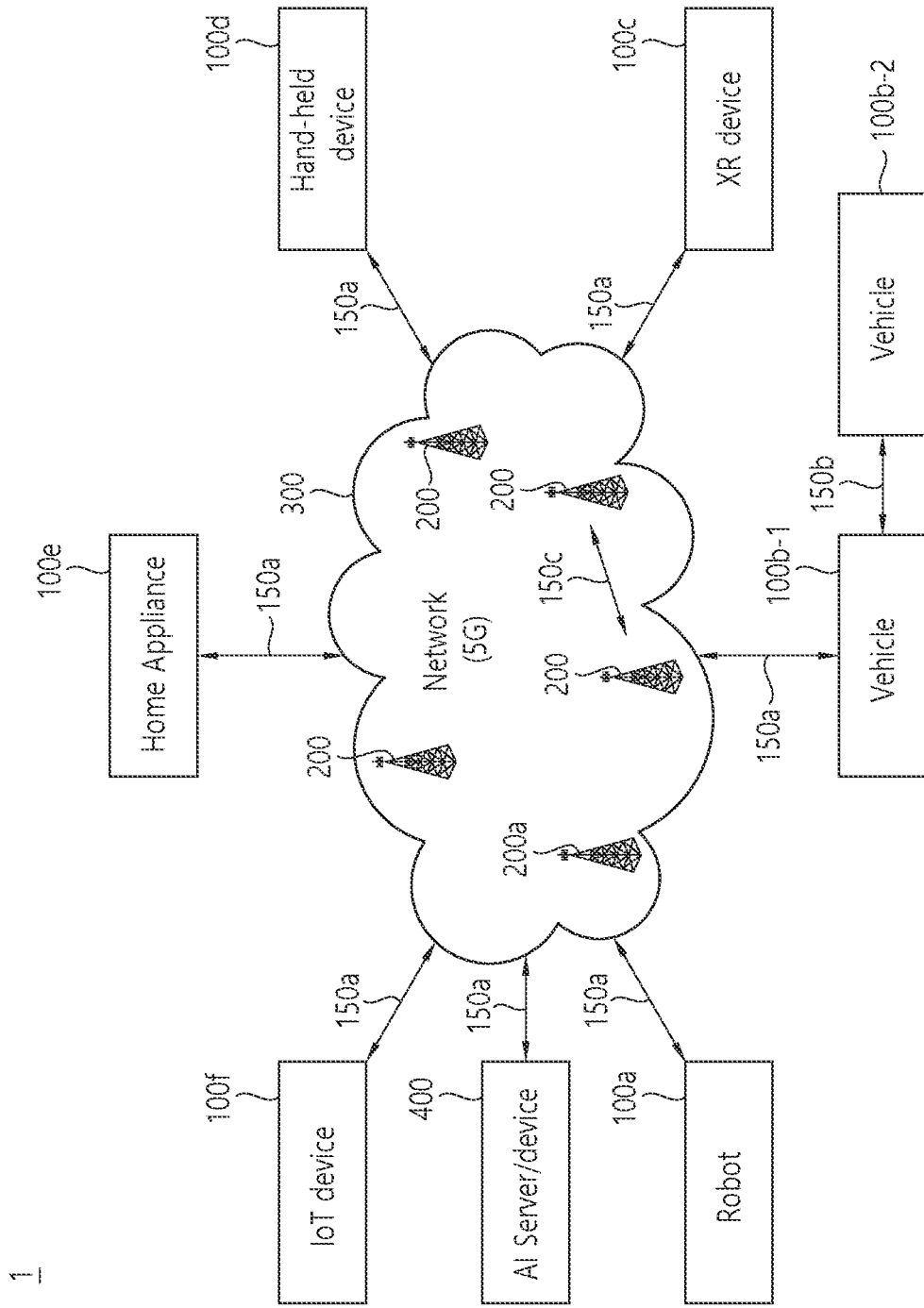
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
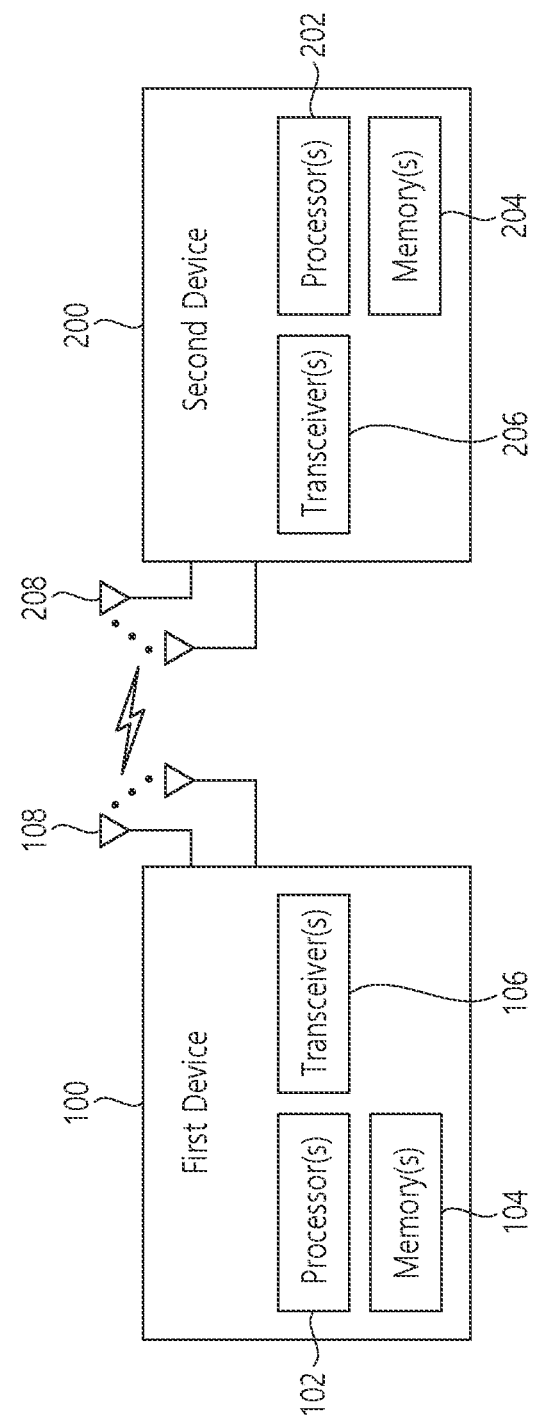
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
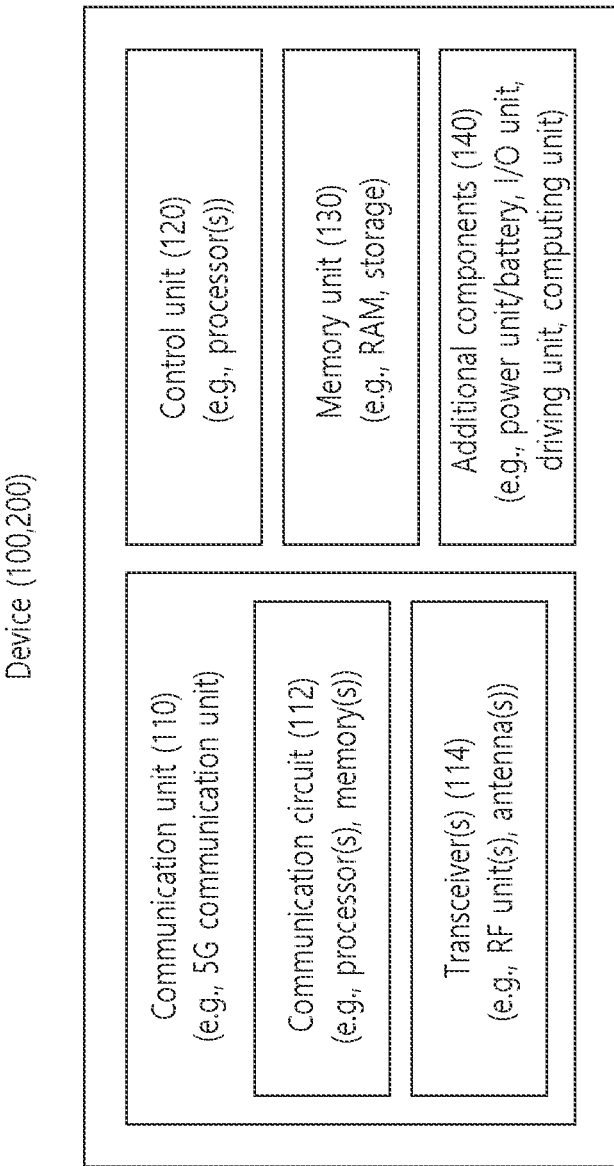
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
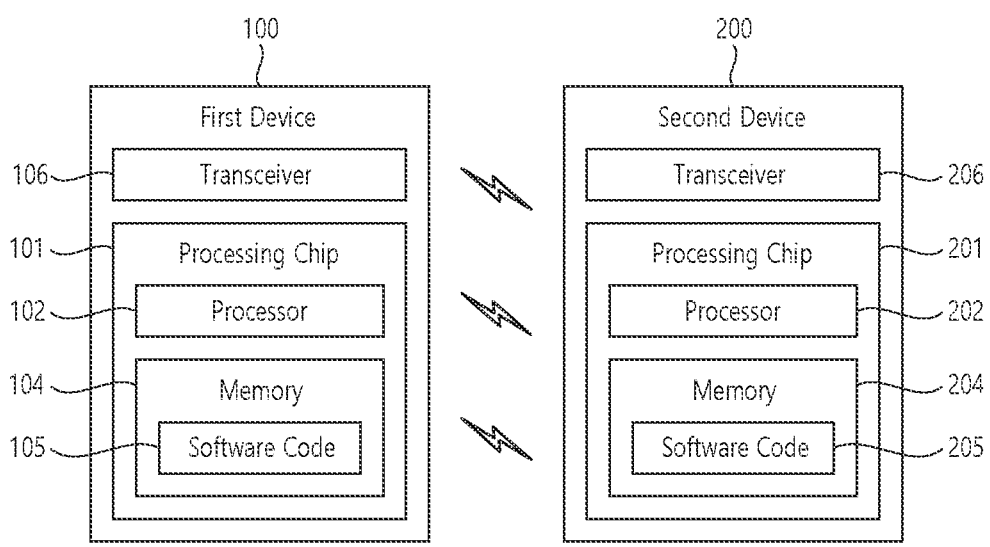
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
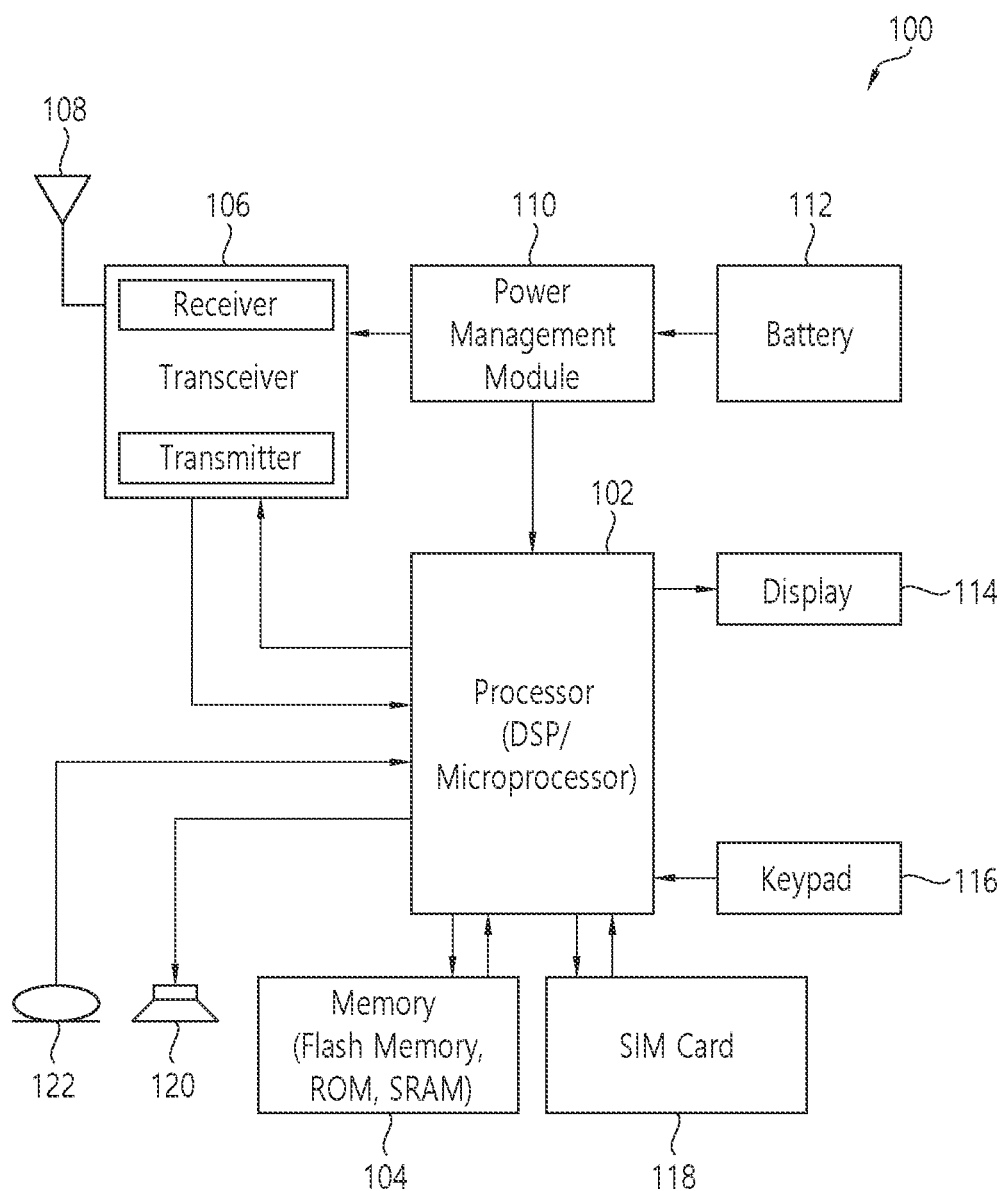
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
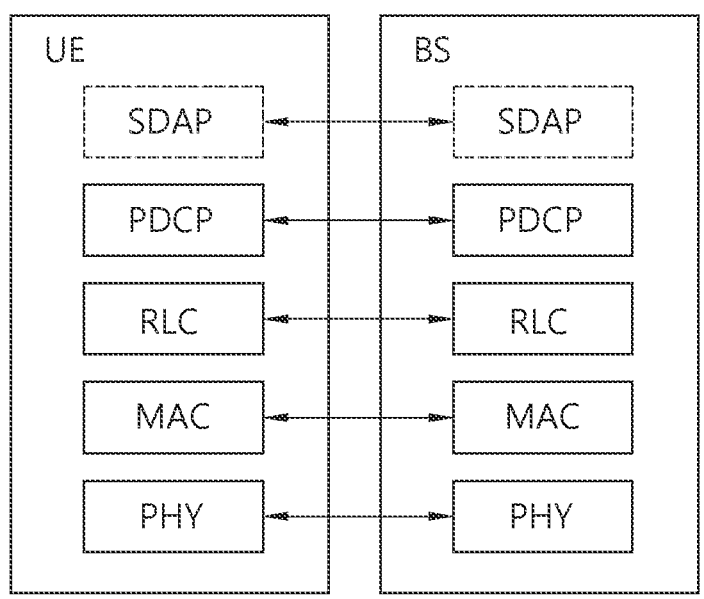
FIGS. 6 and 7 show an example of protocol stacks in a 3GPP based wireless communication system to which implementations of the present disclosure is applied.
Figure 7:
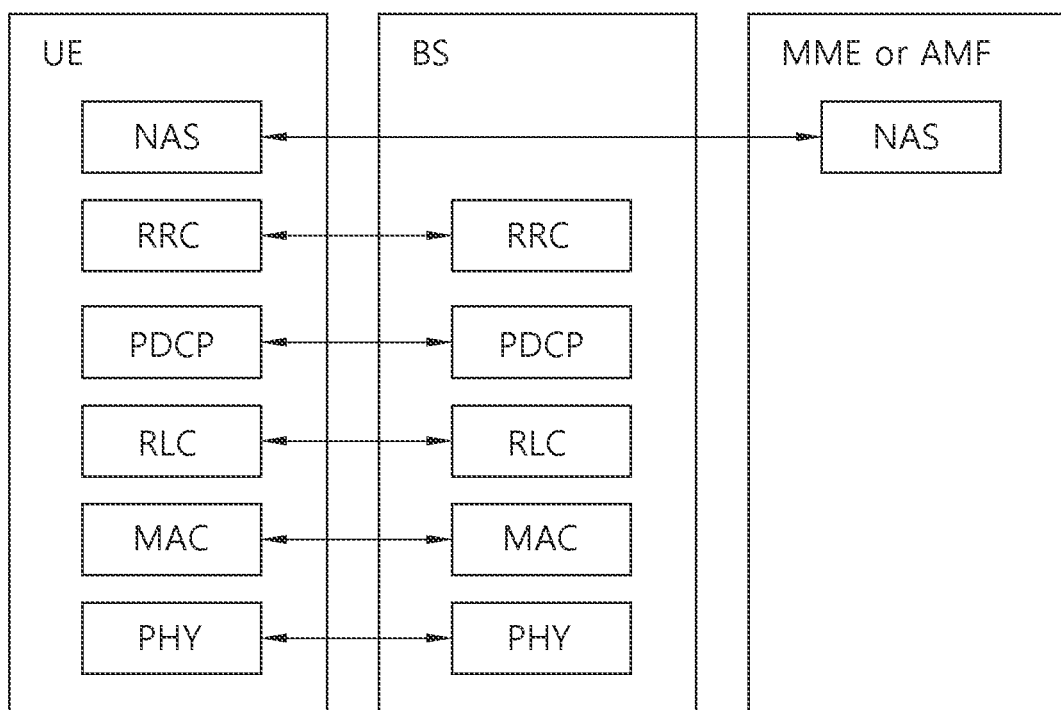

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
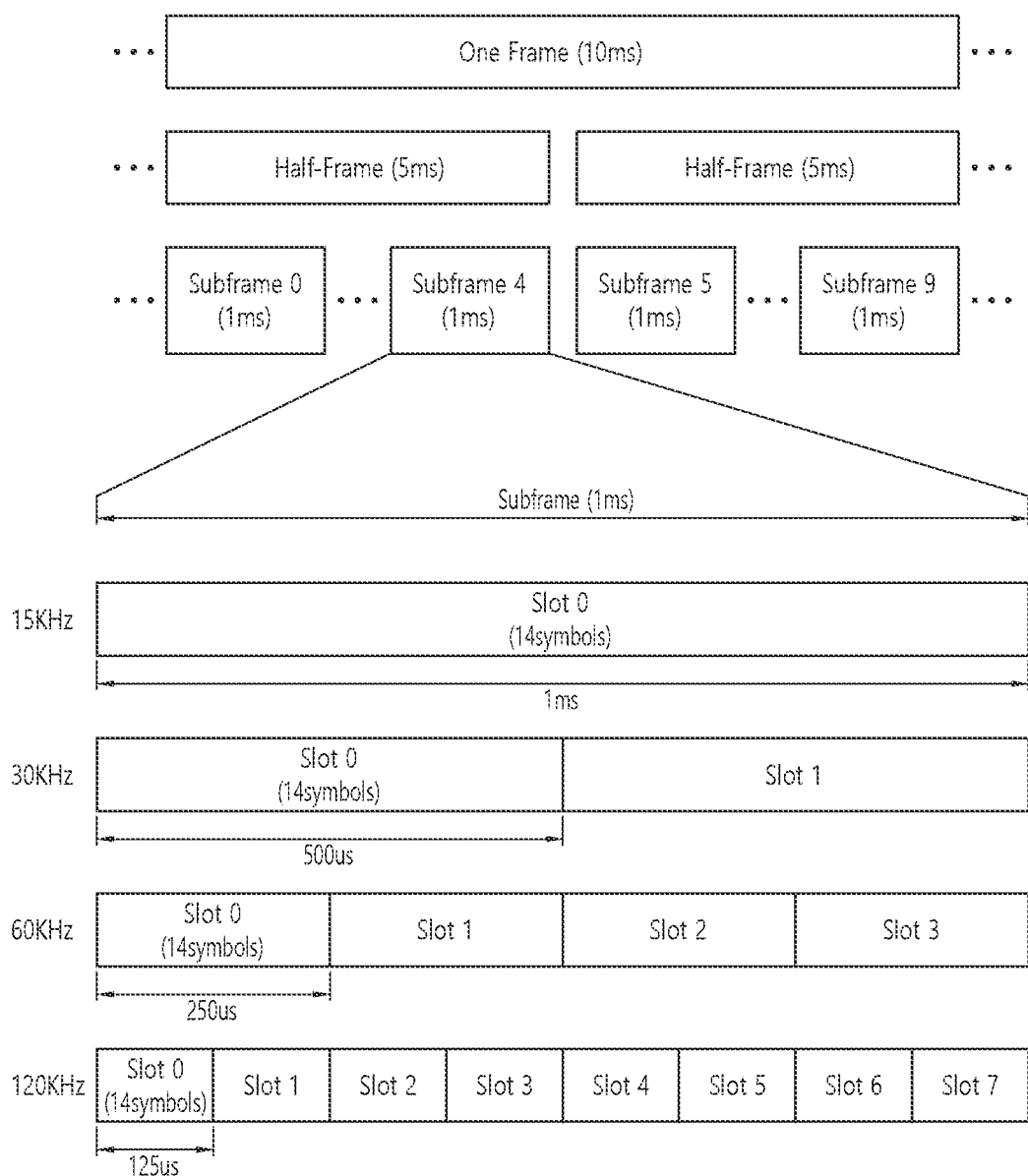
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid,x}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$ where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
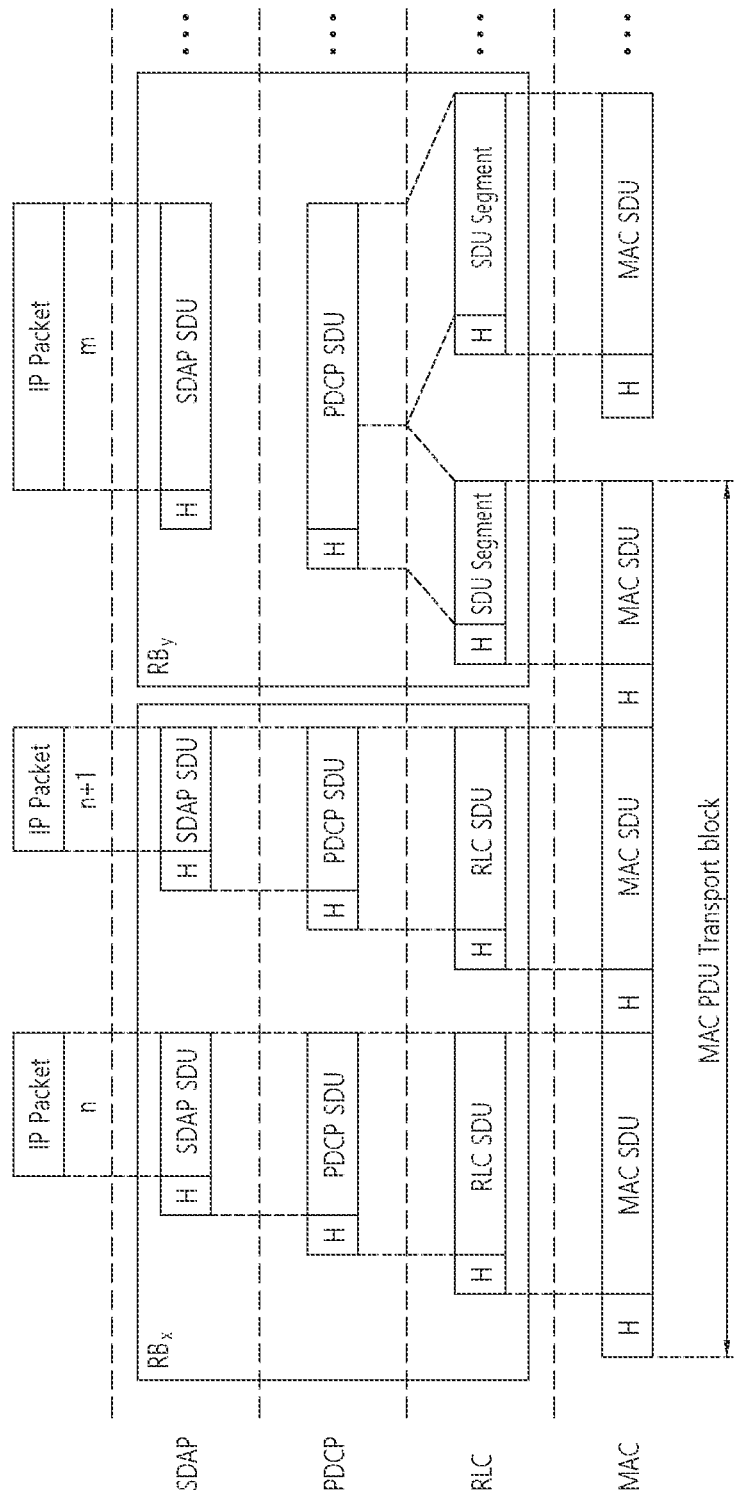
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Vehicle-to-everything (V2X) communication in 5G NR is described. Sections 5.2, 5.4 and 5.6 of 3GPP TS 23.287 V0.3.0 can be referred.

For V2X communication, two types of PC5 reference points exist: the LTE based PC5 reference point, and the NR based PC5 reference point. A UE may use either type of PC5 or both for V2X communication depending on the services the UE supports. The V2X communication over PC5 reference point supports roaming and inter-public land mobile network (PLMN) operations. V2X communication over PC5 reference point is supported when UE is "served by NR or E-UTRA" or when the UE is "not served by NR or E-UTRA".

A UE is authorized to transmit and receive V2X messages when it has valid authorization and configuration.

The V2X communication over PC5 reference point has the following characteristics:

V2X communication over LTE based PC5 reference point is connectionless, i.e., broadcast mode at access stratum (AS) layer, and there is no signaling over PC5 for connection establishment.

V2X communication over NR based PC5 reference point supports broadcast mode, groupcast mode, and unicast mode at AS layer. The UE will indicate the mode of communication for a V2X message to the AS layer. Signaling over control plane over PC5 reference point for unicast mode communication management is supported.

V2X services communication support between UEs over PC5 user plane.

V2X messages are exchanged between UEs over PC5 user plane. Both internet protocol (IP) based and non-IP based V2X messages are supported over PC5 reference point. For IP based V2X messages, only IP version 6 (IPv6) is used. IP version 4 (IPv4) is not supported.

The identifiers used in the V2X communication over PC5 reference point are described below in detail. UE decides on the type of PC5 reference point and Tx Profile to use for the transmission of a particular packet based on the configuration.

If the UE has an active emergency PDU session, the communication over the emergency PDU session shall be prioritized over V2X communication over PC5 reference point.

Broadcast mode of communication is supported over both LTE based PC5 reference point and NR based PC5 reference point. Therefore, when broadcast mode is selected for transmission over PC5 reference point, PC5 RAT selection needs to be performed based on configuration.

For LTE based PC5 reference point, broadcast mode is the only supported communication mode.

For NR based PC5 reference point, the broadcast mode also supports enhanced QoS handling.

Groupcast mode of communication is only supported over NR based PC5 reference point.

Unicast mode of communication is only supported over NR based PC5 reference point. When application layer initiates a V2X service which requires PC5 unicast communication, the UE establishes a PC5 unicast link with the corresponding UE.

After successful PC5 unicast link establishment, UE A and UE B use a same pair of Layer-2 IDs for subsequent PC5-S signaling message exchange and V2X service data transmission. V2X layer of the transmitting UE indicates to AS layer whether the message is for PC5-S signaling message (i.e., Direct Communication Accept, Link Layer Identifier Update Request/Response, Disconnect Request/Response) or service data transmission when it sends message over the established PC5 link. V2X layer of receiving UE handles message if it is PC5-S signaling message whilst the V2X layer of receiving UE forwards the message to the upper layer if it is application data message.

The unicast mode supports per-flow QoS model. During the unicast link establishment, each UEs self-assign PC5 link identifier and associate the PC5 link identifier with the unicast link profile for the established unicast link. The PC5 link identifier is a unique value within the UE. The unicast link profile identified by PC5 link identifier includes application layer identifier and Layer-2 ID of UE A, application layer identifier and Layer-2 ID of UE B and a set of PC5 QoS flow identifier(s) (PFI(s)). Each PFI is associated with QoS parameters (i.e., PC5 QoS indicator (PQI) and optionally range). The PC5 link identifier and PFI(s) are unchanged values for the established unicast link regardless of the change of application layer identifier and Layer-2 ID. The UE uses PFI to indicate the PC5 QoS flow to AS layer, therefore AS layer identifies the corresponding PC5 QoS flow even if the source and/or destination Layer-2 IDs are changed due to, e.g., privacy support. The UE uses PC5 link identifier to indicate the PC5 unicast link to V2X application layer, therefore V2X application layer identifies the corresponding PC5 unicast link even if there are more than one unicast link associated with one service type (e.g., the UE establishes multiple unicast links with multiple UEs for a same service type).

Identifiers for V2X communication is described.

Each UE has one or more Layer-2 IDs for V2X communication over PC5 reference point, consisting of.

Source Layer-2 ID(s); and

Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link, as described below in detail. The source Layer-2 IDs may differ between different communication modes.

When IP-based V2X communication is supported, the UE configures a link local IPv6 address to be used as the source IP address. The UE may use this IP address for V2X communication over PC5 reference point without sending Neighbor Solicitation and Neighbor Advertisement message for Duplicate Address Detection.

If the UE has an active V2X application that requires privacy support in the current geographical area, as identified by configuration, in order to ensure that a source UE (e.g., vehicle) cannot be tracked or identified by any other UEs (e.g., vehicles) beyond a certain short time-period required by the application, the source Layer-2 ID shall be changed over time and shall be randomized. For IP-based V2X communication over PC5 reference point, the source IP address shall also be changed over time and shall be randomized. The change of the identifiers of a source UE must be synchronized across layers used for PC5, e.g., when the application layer identifier changes, the source Layer-2 ID and the source IP address need to be changed.

For broadcast mode of V2X communication over PC5 reference point, the UE is configured with the destination Layer-2 ID(s) to be used for V2X services. The destination Layer-2 ID for a V2X communication is selected based on the configuration.

The UE self-selects a source Layer-2 ID. The UE may use different source Layer-2 IDs for different types of PC5 reference points, i.e., LTE based PC5 and NR based PC5.

For groupcast mode of V2X communication over PC5 reference point, the V2X application layer may provide group identifier information. When the group identifier information is provided by the V2X application layer, the UE converts the provided group identifier into a destination Layer-2 ID. When the group identifier information is not provided by the V2X application layer, the UE determines the destination Layer-2 ID based on configuration of the mapping between service type (e.g., PSID/ITS-AID) and Layer-2 ID.

The UE self-selects a source Layer-2 ID.

For unicast mode of V2X communication over PC5 reference point, the destination Layer-2 ID used depends on the communication peer, which is discovered during the establishment of the unicast link. The initial signaling for the establishment of the unicast link may use a default destination Layer-2 ID associated with the service type (e.g., PSID/ITS-AID) configured for unicast link establishment. During the unicast link establishment procedure, Layer-2 IDs are exchanged, and should be used for future communication between the two UEs.

The UE needs to maintain a mapping between the application layer identifiers and the source Layer-2 IDs used for the unicast links, as the V2X application layer does not use the Layer-2 IDs. This allows the change of source Layer-2 ID without interrupting the V2X applications.

When application layer identifiers changes, the source Layer-2 ID(s) of the unicast link(s) shall be changed if the link(s) was used for V2X communication with the changed application layer identifiers.

A UE may establish multiple unicast links with a peer UE and use the same or different source Layer-2 IDs for these unicast links.

Sidelink buffer status reporting (SL BSR) in LTE-A is described. Section 5.14.1.4 of 3GPP TS 36.321 V15.5.0 can be referred.

The SL BSR procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a proximity-based services (ProSe) destination. Each sidelink logical channel is allocated to a logical channel group (LCG) depending on the priority and optionally the ProSe-per-packet reliability (PPPR) of the sidelink logical channel, and the mapping between LCG ID and priority and optionally the mapping between LCG ID and PPPR which are provided by upper layers in logicalChGroupInfoList. LCG is defined per ProSe Destination.

A SL BSR shall be triggered if any of the following events occur:

>if the MAC entity has a configured sidelink SL radio network temporary identity (RNTI) or a configured SL V2X RNTI (SL-V-RNTI):

>>SL data, for a sidelink logical channel of a ProSe destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the SL BSR is referred below to as "Regular SL BSR";

\>\>UL resources are allocated and number of padding bits remaining after a Padding BSR has been triggered is equal to or larger than the size of the SL BSR MAC control element (CE) containing the buffer status for at least one LCG of a ProSe Destination plus its subheader, in which case the SL BSR is referred below to as "Padding SL BSR";

\>\>retx-BSR-TimerSL expires and the MAC entity has data available for transmission for any of the sidelink logical channels, in which case the SL BSR is referred below to as "Regular SL BSR";

\>\>periodic-BSR-TimerSL expires, in which case the SL BSR is referred below to as "Periodic SL BSR";

\>else:

\>\>An SL-RNTI or an SL-V-RNTI is configured by upper layers and SL data is available for transmission in the RLC entity or in the PDCP entity, in which case the SL BSR is referred below to as "Regular SL BSR".

For Regular and Periodic SL BSR:

\>if the number of bits in the UL grant is equal to or larger than the size of a SL BSR containing buffer status for all LCGs having data available for transmission plus its subheader:

\>\>report SL BSR containing buffer status for all LCGs having data available for transmission;

\>else report Truncated SL BSR containing buffer status for as many LCGs having data available for transmission as possible, taking the number of bits in the UL grant into consideration.

For Padding SL BSR:

\>if the number of padding bits remaining after a Padding BSR has been triggered is equal to or larger than the size of a SL BSR containing buffer status for all LCGs having data available for transmission plus its subheader:

\>\>report SL BSR containing buffer status for all LCGs having data available for transmission;

\>else report Truncated SL BSR containing buffer status for as many LCGs having data available for transmission as possible, taking the number of bits in the UL grant into consideration.

If the BSR procedure determines that at least one SL BSR has been triggered and not cancelled:

\>if the MAC entity has UL resources allocated for new transmission for this TTI and the allocated UL resources can accommodate a SL BSR MAC CE plus its subheader as a result of logical channel prioritization:

\>\>instruct the Multiplexing and Assembly procedure to generate the SL BSR MAC CE(s);

\>\>start or restart periodic-BSR-TimerSL except when all the generated SL BSRs are Truncated SL BSRs;

\>\>start or restart retx-BSR-TimerSL;

\>else if a Regular SL BSR has been triggered:

\>\>if an uplink grant is not configured:

\>\>\>a Scheduling Request shall be triggered.

A MAC PDU shall contain at most one SL BSR MAC control element, even when multiple events trigger a SL BSR by the time a SL BSR can be transmitted in which case the Regular SL BSR and the Periodic SL BSR shall have precedence over the padding SL BSR.

The MAC entity shall restart retx-BSR-TimerSL upon reception of an SL grant.

All triggered regular SL BSRs shall be cancelled in case the remaining configured SL grant(s) valid for this sidelink control (SC) period can accommodate all pending data available for transmission in sidelink communication or in case the remaining configured SL grant(s) valid can accommodate all pending data available for transmission in V2X sidelink communication. All triggered SL BSRs shall be cancelled in case the MAC entity has no data available for transmission for any of the sidelink logical channels. All triggered SL BSRs shall be cancelled when a SL BSR (except for Truncated SL BSR) is included in a MAC PDU for transmission. All triggered SL BSRs shall be cancelled, and retx-BSR-TimerSL and periodic-BSR-TimerSL shall be stopped, when upper layers configure autonomous resource selection.

The MAC entity shall transmit at most one Regular/Periodic SL BSR in a TTI. If the MAC entity is requested to transmit multiple MAC PDUs in a TTI, it may include a padding SL BSR in any of the MAC PDUs which do not contain a Regular/Periodic SL BSR.

All SL BSRs transmitted in a TTI always reflect the buffer status after all MAC PDUs have been built for this TTI. Each LCG shall report at the most one buffer status value per TTI and this value shall be reported in all SL BSRs reporting buffer status for this LCG.

A Padding SL BSR is not allowed to cancel a triggered Regular/Periodic SL BSR. A Padding SL BSR is triggered for a specific MAC PDU only and the trigger is cancelled when this MAC PDU has been built.

Scheduling request (SR) in LTE-A is described. Section 5.4.4 of 3GPP TS 36.321 V15.5.0 can be referred.

The SR is used for requesting UL-SCH resources for new transmission.

When an SR is triggered, it shall be considered as pending until it is cancelled. All pending SR(s) shall be cancelled and sr-ProhibitTimer and ssr-ProhibitTimer shall be stopped when a MAC PDU is assembled and this PDU includes a BSR which contains buffer status up to (and including) the last event that triggered a BSR, or, if all pending SR(s) are triggered by SL BSR, when a MAC PDU is assembled and this PDU includes a SL BSR which contains buffer status up to (and including) the last event that triggered a SL BSR, or, if all pending SR(s) are triggered by SL BSR, when upper layers configure autonomous resource selection, or when the UL grant(s) can accommodate all pending data available for transmission.

If the MAC entity has resources for SR configured on only one of short PUCCH (SPUCCH) and PUCCH, that SR resource is valid for all logical channels. If the MAC entity has resources for SR configured on both PUCCH and SPUCCH, MAC entity shall consider all logical channels that have triggered an SR (and at retxBSR-Timer expiry, MAC entity shall consider all logical channels, belonging to a LCG, with data available for transmission):

PUCCH resources for SR are valid if logicalChannelSr-Restriction is not configured, or if logicalChannelSr-Restriction allows SR on PUCCH, for any of the logical channels;

SPUCCH resources for SR are valid if logicalChannelSr-Restriction is not configured, or if logicalChannelSr-Restriction allows SR on SPUCCH, for any of the logical channels.

If an SR is triggered and there is no other SR pending, the MAC entity shall set the SR_COUNTER and the SSR_COUNTER to 0.

As long as one SR is pending, the MAC entity shall for each TTI:

\>if no UL-SCH resources are available for a transmission in this TTI:

\>\>Except for narrowband IoT (NB-IoT):

\>\>\>if the MAC entity has no valid PUCCH nor valid SPUCCH resource for SR configured in any TTI:

\>\>\>\>if the MAC entity is a MCG MAC entity and rach-Skip is not configured; or >>>>if the MAC entity is a SCG MAC entity and rach-SkipSCG is not configured:
>>>>>initiate a random access procedure on the corresponding SpCell and cancel all pending SRs;
>>>else if this TTI is not part of a measurement gap or SL discovery gap for transmission, and if transmission of V2X sidelink communication is not prioritized in this TTI:
>>>>if the MAC entity has at least one valid SPUCCH resource for SR configured for this TTI and if ssr-ProhibitTimer is not running:
>>>>>if SSR_COUNTER<dssr-TransMax:
>>>>>increment SSR_COUNTER by 1;
>>>>>instruct the physical layer to signal the SR on one valid SPUCCH resource for SR;
>>>>>start the ssr-ProhibitTimer.
>>>>>else:
>>>>>notify RRC to release SPUCCH for all serving cells;
>>>>>if the MAC entity has no valid PUCCH resource for SR configured in any TTI:
>>>>>notify RRC to release PUCCH for all serving cells;
>>>>>notify RRC to release sounding reference signal (SRS) for all serving cells;
>>>>>clear any configured downlink assignments and uplink grants;
>>>>>initiate a random access procedure on the SpCell and cancel all pending SRs.
>>>>>if the MAC entity has at least one valid PUCCH resource for SR configured for this TTI and if sr-ProhibitTimer is not running:
>>>>>if SR_COUNTER<dsr-TransMax:
>>>>>>increment SR_COUNTER by 1;
>>>>>>instruct the physical layer to signal the SR on one valid PUCCH resource for SR;
>>>>>>start the sr-ProhibitTimer.
>>>>>else:
>>>>>>notify RRC to release PUCCH and SPUCCH for all serving cells;
>>>>>>notify RRC to release SRS for all serving cells;
>>>>>>clear any configured downlink assignments and uplink grants;
>>>>>>initiate a random access procedure on the SpCell and cancel all pending SRs.
>>For NB-IoT:
>>>if the MAC entity has no valid resource for SR together with acknowledgement of the data in this TTI and no valid PRACH resource for SR configured in any TTI:
>>>>initiate a random access procedure and cancel all pending SRs.
>>>else:
>>>>if the MAC entity has valid resource for SR together with acknowledgement of the data in this TTI:
>>>>>instruct the physical layer to signal the SR together with acknowledgement of the data.
>>>>else:
>>>>>if the MAC entity has valid PRACH resource for SR configured in this TTI and sr-ProhibitTimer is not running:
>>>>>>instruct the physical layer to signal the SR on one valid PRACH resource for SR.
>>>>>>start the sr-ProhibitTimer in the subframe containing the last repetition of the corresponding SR transmission.

SR_COUNTER is incremented for each SR bundle. sr-ProhibitTimer is started in the first TTI of an SR bundle.

Figure 10:
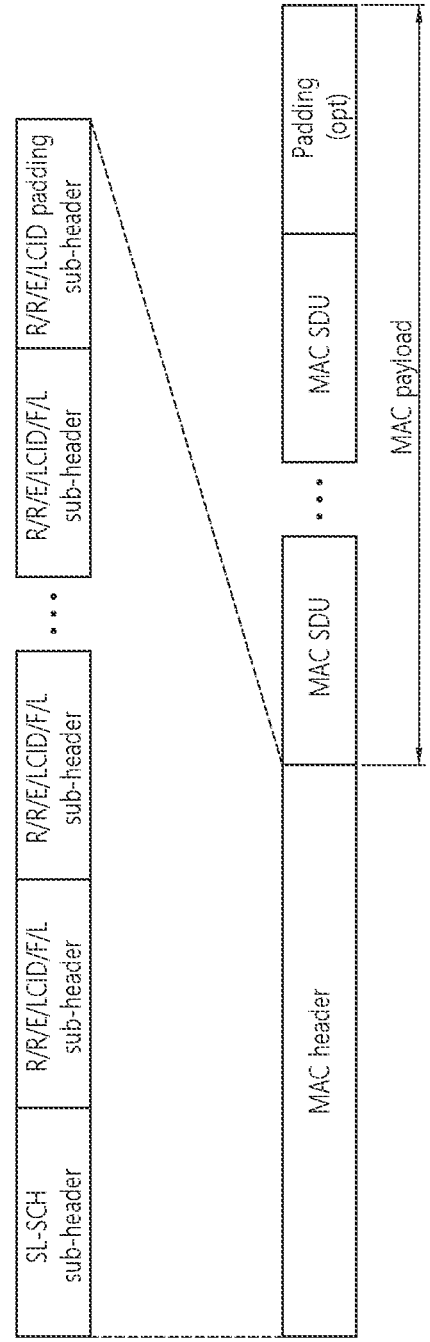
FIG. 10 shows an example of MAC PDU consisting of MAC header, MAC SDUs and padding to which implementations of the present disclosure is applied.

FIG. 10 shows an example of MAC PDU consisting of MAC header, MAC SDUs and padding to which implementations of the present disclosure is applied.

A MAC PDU for sidelink shared channel (SL-SCH) consists of a MAC header, one or more MAC Service Data Units (MAC SDU), and optionally padding.

Both the MAC header and the MAC SDUs are of variable sizes.

A MAC PDU header consists of one SL-SCH subheader, one or more MAC PDU subheaders. Each subheader except SL-SCH subheader corresponds to either a MAC SDU or padding.

The SL-SCH subheader consists of the seven header fields V/R/R/R/R/SRC/DST.

A MAC PDU subheader consists of the six header fields R/R/E/LCID/F/L but for the last subheader in the MAC PDU. The last subheader in the MAC PDU consists solely of the four header fields R/R/E/LCID. A MAC PDU subheader corresponding to padding consists of the four header fields R/R/E/LCID.

MAC PDU subheaders have the same order as the corresponding MAC SDUs and padding.

Padding occurs at the end of the MAC PDU, except when single-byte or two-byte padding is required. Padding may have any value and the MAC entity shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per transport block (TB).

As mentioned above, the SR may be triggered by the SL BSR. Then, if the SR is transmitted to the network, the network may allocate SL grant. However, in sidelink communication for 5G NR, a UE can establish/maintain a direct link, e.g., unicast link/mode, with other UE. Thus, if the UE detects a problem on the direct link, the UE would likely stop sidelink communication. However, the network may not status of the direct link. Thus, the SR may still be transmitted to the network. Thus, transmission of the SR may result in unnecessary SL grant from the network.

In addition, SR transmission on PUCCH may be overlapped with various other transmission, e.g., UL transmission, SL transmission, etc. In this case, which transmission should be prioritized is not yet defined.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

In some implementations, the method in perspective of the wireless device described below may be performed by first wireless device 100 shown in FIG. 2, the wireless device 100 shown in FIG. 3, the first wireless device 100 shown in FIG. 4 and/or the UE 100 shown in FIG. 5.

In some implementations, the method in perspective of the wireless device described below may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

Figure 11:
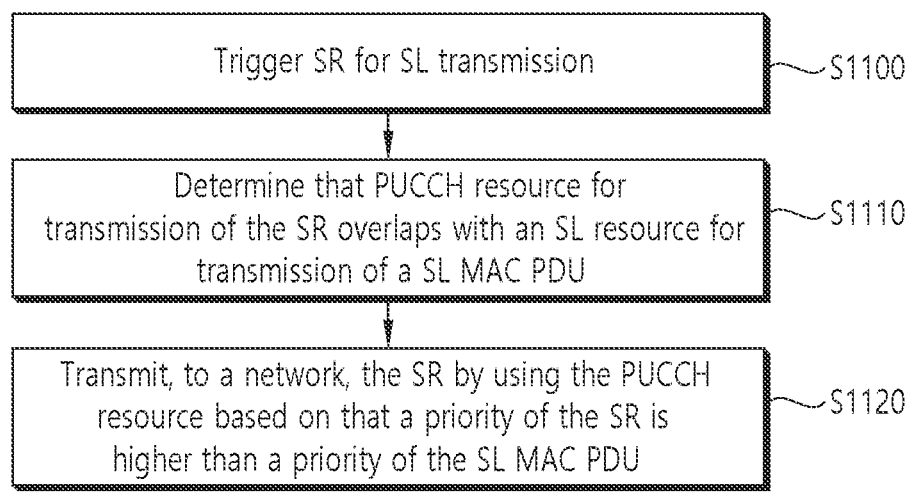
FIG. 11 shows an example of a method for a wireless device to which implementations of the present disclosure is applied.

FIG. 11 shows an example of a method for a wireless device to which implementations of the present disclosure is applied.

In some implementations, the wireless device may be in communication with at least one of a mobile device, a network, and/or autonomous vehicles other than the wireless device.

In step S1100, the wireless device triggers SR for SL transmission.

In some implementations, the SR may be triggered upon that a SL BSR is trigged and an UL grant is not available for the SL BSR.

In some implementations, the SR may be triggered based on a SR configuration received from the network.

In some implementations, the SR may be triggered for one or more logical channels associated with ID. The ID may include at least one of an ID for RRC connection with other wireless device, a link ID for unicast link with other wireless device, a source ID and/or a destination ID. The ID may be indicated to the network.

In some implementations, the triggered SR may be considered as a pending SR.

In step S1110, the wireless device determines that a PUCCH resource for transmission of the SR overlaps with an SL resource for transmission of a SL MAC PDU.

In step S1120, the wireless device transmits, to a network, the SR by using the PUCCH resource based on that a priority of the SR is higher than a priority of the SL MAC PDU.

For example, when a priority value of the SR is lower than a priority value of the SL MAC PDU, the wireless device may transmit the SR by using the PUCCH resource to the network.

In some implementations, the wireless device may not perform simultaneous transmission of the SR and SL MAC PDU.

In some implementations, the wireless device may determine that the PUCCH resource for transmission of the SR overlaps with transmission of a UL MAC PDU. In this case, the wireless device may transmit, to the network, the SR by using the PUCCH resource based on that a priority value of a SL logical channel associated with the PUCCH resource is lower than a threshold.

In some implementations, the wireless device may cancel all pending SRs upon detecting a failure of sidelink communication, upon that a SL grant can accommodate all pending data available from all logical channels for the sidelink communication, and/or upon changing autonomous resource allocation for the sidelink communication.

In some implementations, the failure of sidelink communication may be detected upon that the sidelink communication cannot meet QoS requirement, upon that a unicast link with other wireless device is released, and/or upon that a failure is detected on the unicast link. In addition, a SR prohibit timer (e.g., sr-ProhibitTimer) may be stopped.

Figure 12:
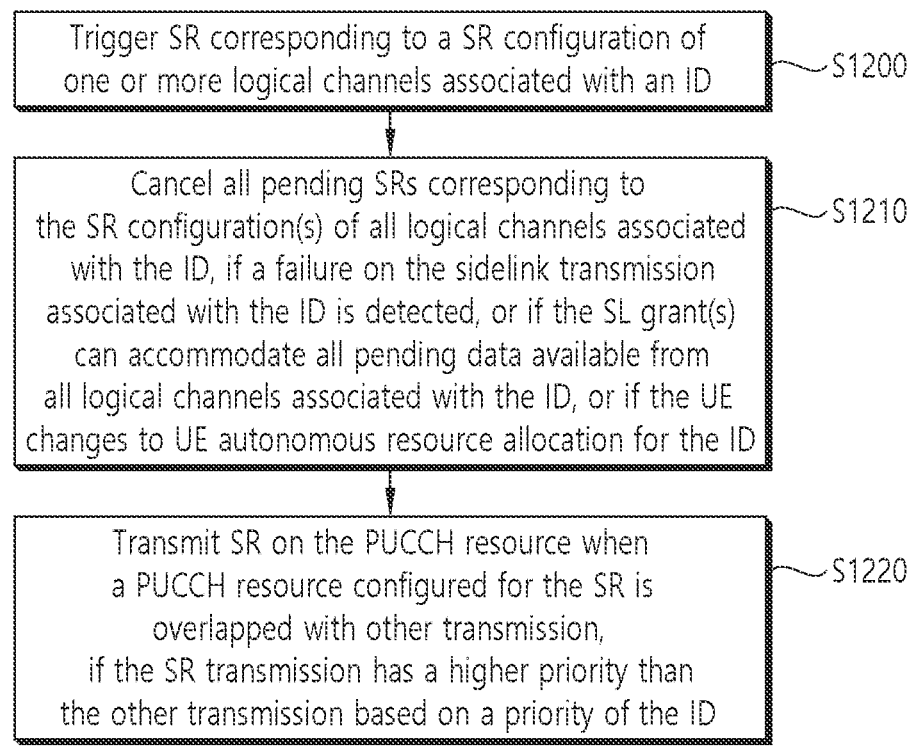
FIG. 12 shows an example of a method for performing sidelink communication for a UE to which implementations of the present disclosure is applied.

FIG. 12 shows an example of a method for performing sidelink communication for a UE to which implementations of the present disclosure is applied.

In step S1200, the UE triggers a SR corresponding to a SR configuration of one or more logical channels associated with an ID. The triggered SR may be considered as pending.

In some implementations, the SR may be triggered if a SL BSR is triggered for a logical channel associated with the ID and a UL grant is not available for the SL BSR.

In some implementations, the UE may indicate the ID to the network. The ID may include at least one of ID for PC5-RRC connection, an ID for a direct link with the other UE for unicast, a link ID, a source ID and/or a destination ID.

In step S1210, if the UE detects a failure on the sidelink transmission associated with the ID, or if the SL grant(s) can accommodate all pending data available from all logical channels associated with the ID for SL transmission, and/or if the UE changes to UE autonomous resource allocation for the ID, the UE cancels all pending SRs corresponding to the SR configuration(s) of all logical channels associated with the ID.

In some implementations, the failure on the sidelink transmission may occur when the sidelink transmission cannot meet QoS requirement related to the ID, when the direct link related to the ID is released, and/or when a failure is detected on the direct link related to the ID.

In some implementations, in this case, the UE may also stop SR prohibit timer (e.g., sr-ProhibitTimer) for the SR configuration(s) of all logical channels associated with the ID.

In step S1220, when a PUCCH resource configured for the SR is overlapped with other transmissions, if the SR transmission has a higher priority than the other transmission based on a priority of the ID, the UE transmits the SR on the PUCCH resource.

Figure 13:
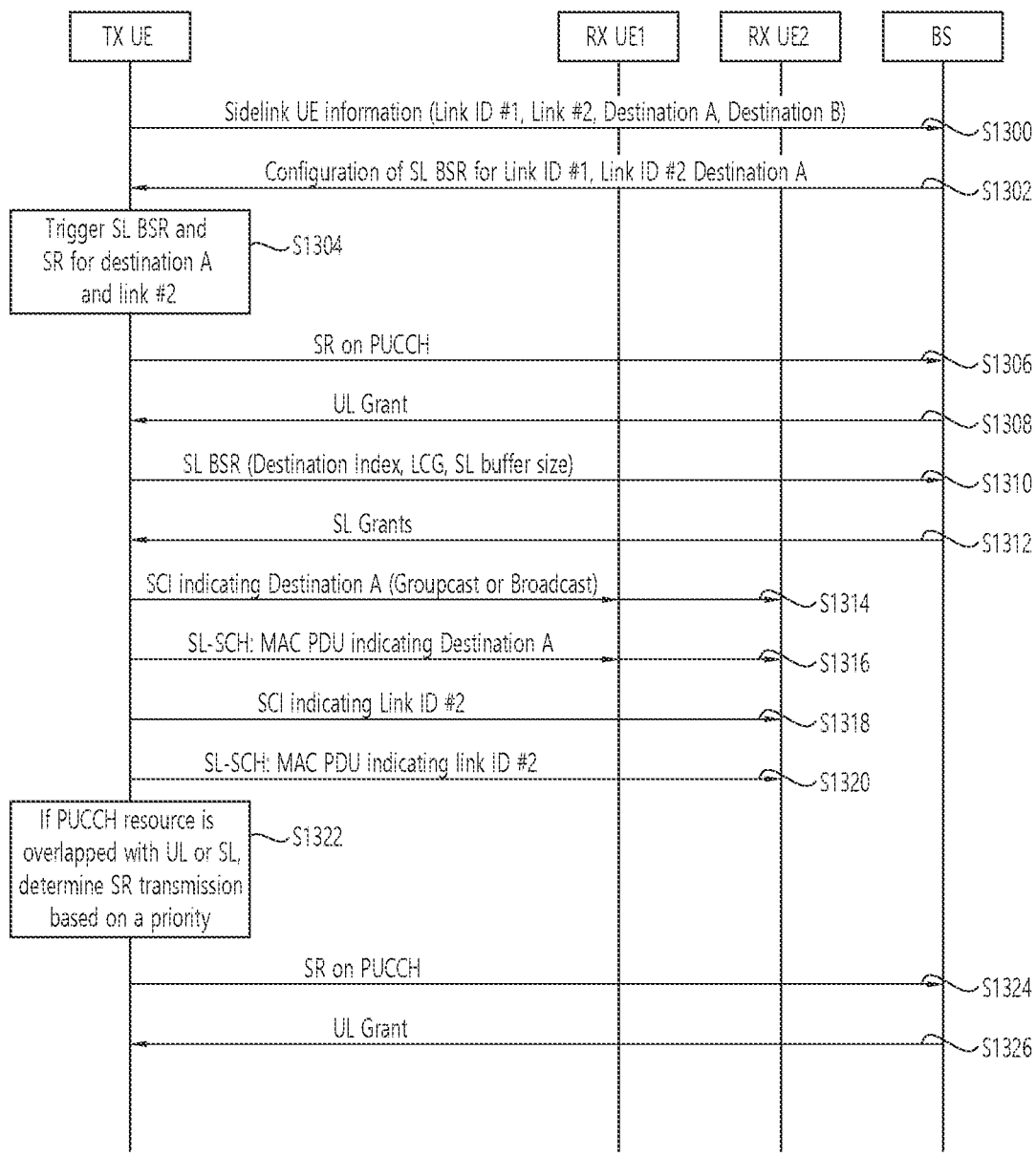
FIG. 13 shows an example of SR transmission for SL communication to which implementations of the present disclosure is applied.

FIG. 13 shows an example of SR transmission for SL communication to which implementations of the present disclosure is applied.

In some implementations, the first UE (e.g., TX UE) may establish a direct link connection with the second UE (e.g., RX UE1) and allocate a PC5 link ID to the direct link connection. If the direct link is established for unicast type of sidelink communication, the first UE may indicate the allocated link ID to the second UE.

In some implementations, if the first UE may establish another direct link connection with the third UE (e.g., RX UE2), the first UE may allocate another link ID to another direct link connection with the third UE. The link ID may be a unique value within the UE.

The Link ID may be associated with one or more destination IDs and/or one or more services used by the first UE.

In step S1300, the first UE transmits Sidelink UE Information message to the base station.

In some implementations, the first UE may inform the base station about one or more link IDs. The first UE may inform the base station about one or more destinations. The first UE may also inform the base station about one or more traffic patterns associated with each of the indicated link ID. Each traffic pattern may be mapped to each LCID, each sidelink radio bearer (SLRB) and/or each QoS value (e.g., PQI value) of the indicated link ID.

In FIG. 13, the TX UE informs that base station of link ID #1, link ID #2, destination A and destination B.

In some implementations, upon receiving the Sidelink UE Information message from the first UE, the base station may determine whether SL resource allocation mode 1 (i.e., network controlled resource allocation) or SL resource allocation mode 2 (i.e., UE autonomous resource allocation) is configured for the link ID.

In step S1302, if SL resource allocation Mode 1 is configured, the base station configures a SL BSR for the first UE. In the configuration of SL BSR, the link IDs indicated by the first UE may be allocated with link indexes. One or more link IDs may be mapped to one link index. One or more sidelink logical channels may be mapped to one link ID.

In FIG. 13, the base station transmits a configuration of BSR for link ID 1 and link ID 2 to the TX UE.

In step S1304, if data is available for transmission among sidelink logical channels associated with the link ID for the direct link connection, the first UE triggers a SL BSR. The SL BSR may indicate the link index mapped to the link ID and/or the amount of sidelink data available for transmission in the SL buffers for the link ID.

In some implementations, for PC5 sidelink transmission, the SL BSR may include one or more sets of a link index, one or more LCG, and one or more buffer sizes for different LCGs. Namely, destination Index may be replaced by link Index for unicast. Alternatively, the SL BSR may include one or more sets of a link index, one or more destination Index, one or more LCG for different destination index, and one or more buffer sizes for different LCGs.

In some implementations, for PC5 groupcast and/or broadcast transmission, the SL BSR may include one or more sets of a destination index, one or more LCG, and one or more buffer sizes for different LCGs. The destination Index may be mapped to one or more destination IDs.

SL BSR may be triggered as follows in detail.

RRC controls BSR reporting for the sidelink by configuring the two timers periodic-BSR-TimerSL and retx-BSR-TimerSL. In this case, the first UE triggers a SL BSR for all destinations and link identifiers used by the first UE, if a condition is met. The SL BSR includes SL buffer sizes for multiple destination IDs and/or multiple link IDs.

Alternatively, RRC controls BSR reporting for the sidelink by configuring the two timers periodic-BSR-TimerSL and retx-BSR-TimerSL for all or some logical channels of each destination ID or for all or some logical channels of each link ID. In this case, the UE triggers a SL BSR for the logical channels of each destination ID and/or each link ID, if a condition is met. The timers run for each destination ID and/or each link ID. The SL BSR includes SL buffer sizes only for the destination ID and/or the link ID.

Each parameter value is associated with each priority or each QoS parameter value (e.g., PQI value). The first UE uses the timer value of a priority and/or a QoS parameter value associated with the highest priority and/or the highest (and/or the lowest) QoS parameter value of logical channels associated with a destination and/or a link ID.

The UE triggers a SL BSR, if any of the following events occur:

SL data, for a sidelink logical channel of the link ID, becomes available for transmission in the RLC entity or in the PDCP entity and either the data belongs to a sidelink logical channel with higher priority than the priorities of the sidelink logical channels which belong to any LCG belonging to the same link ID and for which data is already available for transmission, or there is currently no data available for transmission for any of the sidelink logical channels belonging to the same link ID, in which case the SL BSR is referred below to as "Regular SL BSR";

UL resources are allocated and number of padding bits remaining after a Padding BSR has been triggered is equal to or larger than the size of the SL BSR MAC CE containing the buffer status for at least one LCG of a link ID plus its subheader, in which case the SL BSR is referred below to as "Padding SL BSR";

retx-BSR-TimerSL expires and the MAC entity has data available for transmission for any of the sidelink logical channels, in which case the SL BSR is referred below to as "Regular SL BSR";

periodic-BSR-TimerSL expires, in which case the SL BSR is referred below to as "Periodic SL BSR";

An SL-RNTI or an SL-V-RNTI is configured by upper layers and SL data is available for transmission in the RLC entity or in the PDCP entity, in which case the SL BSR is referred below to as "Regular SL BSR".

If the BSR procedure determines that at least one SL BSR has been triggered and not cancelled, >if the MAC entity has UL resources allocated for new transmission for this TTI and the allocated UL resources can accommodate a SL BSR MAC CE plus its subheader as a result of logical channel prioritization:

>>the UE shall instruct the Multiplexing and Assembly procedure to generate the SL BSR MAC CE(s);

>>the UE shall start or restart periodic-BSR-TimerSL except when all the generated SL BSRs are Truncated SL BSRs;

>>the UE shall start or restart retx-BSR-TimerSL;

>else if a Regular SL BSR has been triggered:

>>if an uplink grant is not configured, the SR shall be triggered.

In step S1306, the first UE triggers and transmits a SR on PUCCH, i.e., when the uplink grant is not configured.

SR may be triggered as follows in detail.

The SR is used for requesting sidelink control information (SCI) resources, SL-SCH resources and SL HARQ feedback resources for new transmission as well as retransmissions.

The MAC entity may be configured with zero, one, or more SR configurations for a destination and/or a link ID. An SR configuration consists of a set of PUCCH resources for SR across different BWPs and cells. For a sidelink logical channel, at most one PUCCH resource for SR is configured per BWP.

Each SR configuration corresponds to one, more or all sidelink logical channels of a destination and/or a link ID. Each logical channel may be mapped to zero or one SR configuration, each destination may be mapped to zero or one SR configuration, and each link ID (i.e., each direct link for the unicast) may be mapped to zero or one SR configuration by the network. The SR configuration of the sidelink logical channel that triggered the SL BSR (if such a configuration exists) is considered as corresponding SR configuration for the triggered SR.

By configuration from the base station and/or pre-configuration, the first UE configures the following parameters for the SR procedure:

sr-ProhibitTimer (per SR configuration);

sr-TransMax (per SR configuration).

Each parameter value is associated with each priority and/or each QoS parameter value (e.g., PQI value). The first UE uses the timer value of a priority and/or a QoS parameter value associated with the highest priority and/or the highest (and/or the lowest) QoS parameter value of a destination and/or a link ID.

The following UE variables are used for the scheduling request procedure:

SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered for a destination and/or a link ID, it shall be considered as pending until it is cancelled.

As long as at least one SR is pending, the UE performs the followings for each pending SR:

If the MAC entity has no valid PUCCH resource configured for the pending SR for the logical channels of the destination and/or the link ID, the UE shall initiate a random access procedure on the SpCell and cancel the pending SR.

Else, if the MAC entity has valid PUCCH resource configured for the pending SR for the logical channels of the destination and/or the link ID and if SR_COUNTER<sr-TransMax, the UE shall increment SR_COUNTER by 1, instruct the physical layer to signal the SR on one valid PUCCH resource for SR, and start the sr-ProhibitTimer for the SR configuration corresponding to the pending SR associated with the logical channels of the destination and/or the link ID.

Else if the MAC entity has valid PUCCH resource configured for the pending SR for the logical channels of the destination and/or the link ID and if SR_COUNTER becomes equal to sr-TransMax, the UE shall notify RRC to release PUCCH for all serving cells, notify RRC to release SRS for all serving cells, clear any configured downlink assignments and uplink grants, clear any PUSCH resources for semi-persistent channel state information (CSI) reporting, initiate a random access procedure on the SpCell and cancel all pending SRs.

When the MAC entity has an SR transmission occasion on the valid PUCCH resource for SR configured, and if sr-ProhibitTimer is not running at the time of the SR transmission occasion, and if the PUCCH resource for the SR transmission occasion does not overlap with a measurement gap, and if the PUCCH resource for the SR transmission occasion does not overlap with a UL-SCH resource, if SR_COUNTER<sr-TransMax, the UE shall increment SR_COUNTER by 1, instruct the physical layer to signal the SR on one valid PUCCH resource for SR and start the sr-ProhibitTimer.

Only PUCCH resources on a BWP which is active at the time of SR transmission occasion may be considered valid.

If at least one of the following conditions are met for a PUCCH resource configured for the pending SR for the logical channels of the destination and/or the link ID, the UE transmits the pending SR on the PUCCH resource:

in case the PUCCH resource is not overlapped with PUSCH; or in case the PUCCH resource is not overlapped with physical sidelink shared channel (PSSCH); or in case the PUCCH resources are on a BWP which is active at the time of SR transmission occasion; or in case a BSR MAC CE on PUSCH is overlapped with the PUCCH resource, if a LCG included in the BSR MAC CE is not associated with a UL logical channel of a service prioritized by the upper layers, or not associated with a UL logical channel of a priority value lower than a threshold indicated by the base station for the PUCCH resource; or in case a UL MAC PDU on PUSCH is overlapped with the PUCCH resource, if the MAC PDU does not include data from a UL logical channel of a service prioritized by the upper layers or a UL logical channel of a priority value lower than a threshold indicated by the base station for the PUCCH resource; or in case a UL MAC PDU on PUSCH is overlapped with the PUCCH resource, if the priority value of the SL logical channel associated with the PUCCH resource is lower than a threshold; or in case a SL specific MAC CE (e.g., SL BSR MAC CE) on PUSCH is overlapped with the PUCCH resource, if a SL logical channel associated with the MAC CE has a lower priority than a SL logical channel associated with the PUCCH resource; or in case a SL specific MAC CE (e.g., SL BSR MAC CE) on PUSCH is overlapped with the PUCCH resource, if the priority value of a SL logical channel associated with the PUCCH resource is lower than a threshold; or in case a SL MAC PDU on physical sidelink control channel (PSCCH) is overlapped with the PUCCH resource, if a SL logical channel associated with the MAC PDU has a lower priority than a SL logical channel associated with the PUCCH resource (e.g., a priority value of SL logical channel associated with the MAC PDU is higher than a priority value of a SL logical channel associated with the PUCCH resource); or in case a SL MAC PDU on PSCCH is overlapped with the PUCCH resource, if the priority value of a SL logical channel associated with the PUCCH resource is lower than a threshold.

The MAC entity may stop, if any, ongoing random access procedure due to a pending SR which has no valid PUCCH resources configured for the logical channels of the destination and/or the link ID, which was initiated by MAC entity prior to the MAC PDU assembly. Such a random access procedure may be stopped when the MAC PDU is transmitted using a UL grant other than a UL grant provided by random access response, and this PDU includes a SL BSR MAC CE which contains buffer status up to (and including) the last event that triggered a BSR prior to the MAC PDU assembly, and/or when the SL grant(s) can accommodate all pending data available for transmission for the destination and/or the link ID.

In some implementations, the first UE may cancel all pending SRs corresponding to the SR configuration(s) of all logical channels associated with the ID and triggered prior to assembly of the MAC PDU when the MAC PDU is transmitted in UL and this PDU includes a SL BSR MAC CE which contains buffer status up to (and including) the last event that triggered a SL BSR associated with the destination and/or the link ID prior to the MAC PDU assembly.

In some implementations, the first UE may cancel all pending SR(s) corresponding to the SR configuration(s) of one, more or all logical channels associated with the destination and/or the link ID and stops the respective sr-ProhibitTimer corresponding to the SR configuration(s) if one of the following events occurs:

when the serving base station reconfigures SL transmission from SL resource allocation mode 1 to SL resource allocation mode 2 for the logical channels of the destination and/or the link ID to the first UE; or when the direct link connection associated with the destination and/or the link ID is released; or when the first UE detects link failure on the direct link connection; or when the first UE receives link failure information from the second UE (e.g., if the second UE informs the first UE about the link failure information indicating radio link failure (RLF), retransmission failure, security failure and/or reconfiguration failure based on transmission from the first UE); or when the first UE detects that QoS requirement cannot be guaranteed for the destination nor the link ID (the QoS requirement may include one of a target data rate, a target delay, a target communication range, and/or a target reliability for the destination and/or the link ID); or when a quality of the direct link (e.g., based on channel busy ratio (CBR) measurement in the first UE, or channel quality indicator (CQI_report, or based on sidelink reference signal received power (SL-RSRP) or sidelink reference signal received quality (SL-RSRQ) measurement report from the second UE) on the direct link is lower than a threshold; or when the first UE cannot detect transmission from any receiving UE for the destination and/or the link ID; or when the MAC entity has no data available for transmission for any of the sidelink logical channels associated with the destination and/or the Link ID; or when a SL BSR associated with the destination and/or the link ID (except for Truncated SL BSR) is included in a MAC PDU for UL transmission; or when the remaining configured SL grant(s) valid for the destination and/or the link ID can accommodate all pending data available for SL transmission associated with the destination and/or the link ID; or when the SL grant(s) can accommodate all pending data available for transmission for the destination and/or the link ID.

when the UE changes a PCell or a PSCell, e.g., due to handover and/or cell selection.

In step S1308, the first UE receives a UL grant based on the SR transmission.

In step S1310, the first UE performs transmission of the SL BSR as follows.

A MAC PDU shall contain at most one SL BSR MAC CE for a destination and/or a link ID, even when multiple events trigger a SL BSR associated with the destination and/or the link ID by the time a SL BSR can be transmitted in which case the Regular SL BSR and the Periodic SL BSR shall have precedence over the padding SL BSR, the SL BSR associated with the link ID shall have precedence over the SL BSR associated with the destination, the SL BSR associated with unicast transmission shall have precedence over the SL BSR associated with groupcast transmission and/or broadcast transmission, and the SL BSR associated with groupcast transmission shall have precedence over the SL BSR associated with broadcast transmission.

The network and/or the first UE may allocate a priority of the link ID which can be the highest priority of sidelink logical channels associated with the link ID, e.g., based on QFI and/or QoS parameter value such as PQI. Different priorities can be configured for different link IDs. If allocated, when multiple events trigger a SL BSR associated with a destination and/or a link ID by the time a SL BSR can be transmitted, the SL BSR associated with the highest priority of the link ID or the highest priority of sidelink logical channels associated with the destination and/or the link ID shall have precedence over the other SL BSRs. In addition, the SL BSR associated with a link ID shall have precedence over the SL BSR associated with a destination, the SL BSR associated with unicast transmission shall have precedence over the SL BSR associated with groupcast transmission and/or broadcast transmission, and the SL BSR associated with groupcast transmission shall have precedence over the SL BSR associated with broadcast transmission.

The MAC entity shall restart retx-BSR-TimerSL associated with a destination and/or a link ID upon reception of an SL grant associated with the destination and/or the link ID.

The MAC entity shall transmit at most one Regular/Periodic SL BSR in a TTI. If the MAC entity is requested to transmit multiple MAC PDUs in a TTI, it may include a padding SL BSR in any of the MAC PDUs which do not contain a Regular/Periodic SL BSR.

All SL BSRs transmitted in a TTI always reflect the buffer status for a destination and/or a link ID after all MAC PDUs have been built for this TTI. Each LCG shall report at the most one buffer status value per TTI and this value shall be reported in all SL BSRs reporting buffer status for this LCG.

A Padding SL BSR is not allowed to cancel a triggered Regular/Periodic SL BSR. A Padding SL BSR is triggered for a specific MAC PDU only and the trigger is cancelled when this MAC PDU has been built.

In some implementations, in the first UE, all triggered Sidelink BSRs only associated with the destination and/or the link ID shall be cancelled if one of the following events occurs:

when the base station reconfigures SL transmission from SL resource allocation mode 1 to SL resource allocation mode 2 for the destination and/or the link ID to the first UE; or when the direct link connection associated with the destination and/or the link ID is released; or when the first UE detects link failure on the direct link connection; or when the first UE receives link failure information from the second UE (e.g., if the second UE informs the first UE about the link failure information indicating RLF, retransmission failure, security failure and/or reconfiguration failure based on transmission from the first UE); or when the first UE detects that QoS requirement cannot be guaranteed for the destination nor the link ID (the QoS requirement may include one of a target data rate, a target delay, a target communication range, and/or a target reliability for the destination and/or the link ID); or when a quality of the direct link (e.g., based on CBR measurement in the first UE, or CQI report, or based on SL-RSRP or SL-RSRQ measurement report from the second UE) on the direct link is lower than a threshold; or when the first UE cannot detect transmission from any receiving UE for the destination and/or the link ID; or when the MAC entity has no data available for transmission for any of the sidelink logical channels associated with the destination and/or the link ID; or when a SL BSR associated with the destination and/or the link ID (except for Truncated SL BSR) is included in a MAC PDU for UL transmission; or when the remaining configured SL grant(s) valid for the destination and/or the link ID can accommodate all pending data available for SL transmission associated with the destination and/or the link ID; or when the UE changes a PCell or a PSCell, e.g., due to handover and/or cell selection.

In some implementations, all triggered SL BSRs only associated with the destination and/or the link ID shall be cancelled, and retx-BSR-TimerSL and periodic-BSR-TimerSL shall be stopped for the destination and/or the link ID, when the base station configures autonomous resource selection for the destination and/or the link ID.

Alternatively, all triggered SL BSRs only associated with a logical channel of the destination and/or the link ID shall be cancelled, and retx-BSR-TimerSL and periodic-BSR-TimerSL shall be stopped for a logical channel of the destination and/or the link ID, when the base station configures autonomous resource selection for a logical channel of the destination and/or the link ID.

In step S1312, the base station transmits SL grant based on the SL BSR received from the first UE.

In step S1314, the first UE transmits SCI indicating destination A. For groupcast transmission, the second UE and third UE may belong to a group.

In step S1316, the first UE transmits MAC PDU indicating destination A on SL-SCH to the second UE and third UE by using the SL grant.

In step S1318, the first UE transmits SCI indicating link ID #2, which identifies unicast link between the first UE and the third UE, to the third UE.

In step S1320, the first UE transmits MAC PDU indicating link ID #2 on SL-SCH to the third UE by using the SL grant.

In step S1322, PUCCH resource for SR transmission overlaps with UL transmission and/or SL transmission. The first UE determines SR transmission based on a priority.

For example, when the PUCCH resource for SR transmission overlaps with an SL resource for transmission of a SL MAC PDU, and if a priority of the SR transmission is higher than a priority of the SL MAC PDU, the first UE may determine to transmit the SR.

For example, when the PUCCH resource for SR transmission overlaps with transmission of a UL MAC PDU, and if a priority value of a SL logical channel associated with the PUCCH resource is lower than a threshold, the first UE may determine to transmit the SR.

In step S1324, the first UE transmits the SR on PUCCH.

In step S1326, the first UE receives UL grant from the base station.

According to implementations of the present disclosure, as long as at least one SR is pending, the MAC entity shall for each pending SR:

2> if the MAC entity has no valid PUCCH resource configured for the pending SR:

2> initiate a random access procedure) on the SpCell and cancel the pending SR.

1> else, for the SR configuration corresponding to the pending SR:

2> when the MAC entity has an SR transmission occasion on the valid PUCCH resource for SR configured; and 2> if sr-ProhibitTimer is not running at the time of the SR transmission occasion; and 2> if the PUCCH resource for the SR transmission occasion does not overlap with a measurement gap:

3> if the PUCCH resource for the SR transmission occasion overlaps with neither a UL-SCH resource nor an SL-SCH resource; or 3> if the MAC entity is configured with lch-basedPrioritization, and the PUCCH resource for the SR transmission occasion overlaps with any UL-SCH resource(s), and the priority of the logical channel that triggered SR is higher than the priority of the uplink grant(s) for any UL-SCH resource(s); or 3> if a SL-SCH resource overlaps with the PUCCH resource for the SR transmission occasion for the pending SR, and the MAC entity is not able to perform this SR transmission simultaneously with the transmission on the SL-SCH resource is not prioritized or the priority value of the logical channel that triggered SR is lower than ul-Prioritization-thres, if configured; or 3> if a SL-SCH resource overlaps with the PUCCH resource for the SR transmission occasion for the pending SR, and the MAC entity is not able to perform this SR transmission simultaneously with the transmission of the SL-SCH resource, and the priority of the triggered SR is higher than the priority of the MAC PDU for the SL-SCH resource:

4> the other overlapping uplink grant(s), if any, is a de-prioritized uplink grant;

4> if SR_COUNTER<sr-TransMax:

5> instruct the physical layer to signal the SR on one valid PUCCH resource for SR;

5> if listen-before-talk (LBT) failure indication is not received from lower layers:

5> increment SR_COUNTER by 1;

6> start the sr-ProhibitTimer.

4> else:

5> notify RRC to release PUCCH for all serving cells;

5> notify RRC to release SRS for all Serving Cells;

5> clear any configured downlink assignments and uplink grants;

5> clear any PUSCH resources for semi-persistent CSI reporting;

5> initiate a random access procedure on the SpCell and cancel all pending SRs.

If more than one individual SR triggers an instruction from the MAC entity to the physical layer to signal the SR on the same valid PUCCH resource, the SR_COUNTER for the relevant SR configuration is incremented only once.

When the MAC entity has pending SR for SCell beam failure recovery and the MAC entity has one or more PUCCH resources overlapping with PUCCH resource for SCell beam failure recovery for the SR transmission occasion, the MAC entity considers only the PUCCH resource for SCell beam failure recovery as valid.

For a UE operating in a semi-static channel access mode, PUCCH resources overlapping with the idle time of a fixed frame period are not considered valid.

In the present disclosure, sidelink resource allocation may be performed as follows.

In some implementations, if the TX UE is in RRC_CONNECTED and configured for network scheduled sidelink resource allocation, the TX UE may transmit sidelink UE information to the network. The sidelink UE information may include at least one of the followings: traffic pattern of service A, TX carriers and/or RX carriers mapped to service A, QoS information related to service A (e.g., 5QI, PPPP, PPPR, QCI value), service type of service A (e.g., unicast, groupcast, broadcast) and destination related to service A and/or another UE (e.g., destination ID, destination index or UE ID mapped to service A and/or the another UE).

In some implementations, after receiving the sidelink UE information, the network may construct sidelink configuration. The sidelink configuration may include at least one of the followings: one or more resource pools for service A and/or unicast transmission with another UE and Sidelink buffer status report (BSR) configuration such as mapping between a logical channel group (LCG) and one or more QoS values or mapping between a LCG and the service type of Service A. The network may signal the sidelink configuration to the TX UE and then the TX UE may configure lower layers with sidelink configuration.

In some implementations, if a message becomes available in L2 buffer for sidelink transmission, the TX UE may trigger scheduling request (SR) for sidelink signaling (e.g., a particular PSCCH or sidelink connection establishment), so that the TX UE transmits PUCCH resource mapped to sidelink signaling. If PUCCH resource is not configured, the TX UE may perform random access procedure as the scheduling request. If an uplink grant is given at a result of the SR, the TX UE may transmit sidelink BSR to the network. The sidelink BSR may indicate at least a destination index or UE Index, a LCG, and a buffer size corresponding to the destination service, the destination group or the destination UE. The destination index may address the destination service, the destination group or the destination UE. The UE index may address the destination/RX UE.

In some implementations, after receiving the SL BSR, the network may transmit a sidelink grant to the TX UE, e.g., by sending DCI in PDCCH. The DCI may include an allocated sidelink resource, the destination index and/or UE index. The index may be used to indicate the service A and/or the RX UE, explicitly or implicitly. If the TX UE receives the DCI, the TX UE may use the sidelink grant for transmission to the TX UE.

In some implementations, if the TX UE is configured for UE autonomous scheduling of sidelink resource allocation, the TX UE may autonomously select or reselect sidelink resources to create a sidelink grant used for transmission to the RX UE.

The present disclosure can have various advantageous effects.

For example, a UE can perform SL triggered SR transmission based on direct priority comparisons with other transmissions.

For example, a UE can perform SL triggered SR transmission selectively based on priority of the SL triggered SR transmission, in particular when the UE cannot perform simultaneous transmission of the SL triggered SR SL transmission and other transmissions (e.g., SL MAC PDU and/or UL MAC PDU).

For example, a UE can avoid unnecessary SR transmission for sidelink resource allocation and properly handle overlapped transmission with SL/UL transmission, in particular when the UE has several direct links with several UEs and detects a problem on one of the direct links possibly due to overlapped transmission.

For example, the system can properly request SL resources when a UE performs several transmissions in SL and UL.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device configured to operate in a wireless communication system, the method comprising:
   triggering a scheduling request (SR) for requesting sidelink (SL) resources based on i) a SL buffer status report (SL-BSR) having been triggered for a logical channel and ii) an uplink (UL) resource being unavailable; and
   based on i) a physical uplink control channel (PUCCH) resource for SR transmission overlapping with an SL resource for transmission of a SL media access control (MAC) protocol data unit (PDU) and ii) a priority of the SR being higher than a priority of the SL MAC PDU:
   transmitting, to a network, the SR on the PUCCH resource for the SR,
   wherein the priority of the SR corresponds to a priority of the logical channel that triggered the SR.

2. The method of claim 1, wherein the SR is triggered according to a SR configuration received from the network.

3. The method of claim 1, wherein the SL-BSR includes a destination index.

4. The method of claim 1, wherein the triggered SR is considered as a pending SR.

5. The method of claim 4, further comprising canceling the pending SR based on at least one of (i) a failure of sidelink communication being detected, (ii) that a SL grant can accommodate all pending data available from all logical channels for the sidelink communication, or (iii) autonomous resource allocation for the sidelink communication being changed.

6. The method of claim 5, wherein the failure of sidelink communication is detected based on at least one of (i) the sidelink communication not satisfying a quality of service (QoS) requirement, (ii) a unicast link with other wireless device being released, or (iii) a failure being detected on the unicast link.

7. The method of claim 5, wherein a SR prohibit timer is stopped.

8. The method of claim 1, further comprising:
   determining that the PUCCH resource for transmission of the SR overlaps with transmission of a UL MAC PDU; and
   transmitting, to the network, the SR by using the PUCCH resource based on a priority value of a SL logical channel associated with the PUCCH resource being lower than a threshold.

9. The method of claim 1, wherein the wireless device is in communication with at least one of a mobile device, a network, or autonomous vehicles other than the wireless device.

10. A wireless device configured to operate in a wireless communication system, the wireless device comprising:
   at least one transceiver;
   at least one processor; and
   at least one computer memory operably connectable to the at least one processor and storing instructions that, based on being executed by the at least one processor, perform operations comprising:
   triggering a scheduling request (SR) for requesting sidelink (SL) resources based on i) a SL buffer status report (SL-BSR) having been triggered for a logical channel and ii) an uplink (UL) resource being unavailable; and
   based on i) a physical uplink control channel (PUCCH) resource for SR transmission overlapping with an SL resource for transmission of a SL media access control (MAC) protocol data unit (PDU) and ii) a priority of the SR being higher than a priority of the SL MAC PDU;

transmitting, to a network, the SR on the PUCCH resource for the SR, wherein the priority of the SR corresponds to a priority of the logical channel that triggered the SR.

11. At least one computer memory operably connectable to at least one processor and storing instructions that, based on being executed by the at least one processor, perform operations comprising:

triggering a scheduling request (SR) for requesting sidelink (SL) resources based on i) a SL buffer status report (SL-BSR) having been triggered for a logical channel and ii) an uplink (UL) resource being unavailable; and based on i) a physical uplink control channel (PUCCH) resource for SR transmission overlapping with an SL resource for transmission of a SL media access control (MAC) protocol data unit (PDU) and ii) a priority of the SR being higher than a priority of the SL MAC PDU:

transmitting, to a network, the SR on the PUCCH resource for the SR, wherein the priority of the SR corresponds to a priority of the logical channel that triggered the SR.

* * * * *